Figure 1:
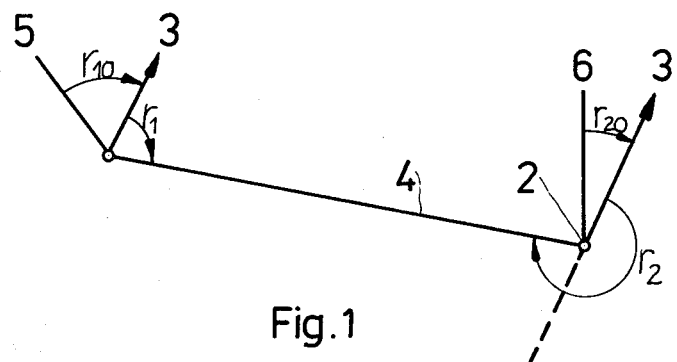

United States Patent [19]

Feist

[11] 4,441,812

[45] Apr. 10, 1984

[54] METHOD AND APPARATUS FOR AUTOMATIC ALIGNMENT OF AN ANGLE-MEASURING INSTRUMENT

[75] Inventor: Wieland Feist, Jena-Lobeda, German Democratic Rep.

[73] Assignee: Jenoptik Jena GmbH, Jena, German Democratic Rep.

[21] Appl. No.: 316,473

[22] Filed: Oct. 30, 1981

[30] Foreign Application Priority Data

Dec. 24, 1980 [DD] German Democratic Rep. ... 226659

[51] Int. Cl.³ .......................... G01C 1/02; G01B 11/26
[52] U.S. Cl. ..................................... 356/147; 33/228; 356/138
[58] Field of Search ......................... 356/138, 147–149; 33/281, 293, 228, 1 CC

[56] References Cited

U.S. PATENT DOCUMENTS

2,933,730  4/1960  Main ......................... 33/281
4,136,955  1/1979  Aeschlimann et al. ............. 356/141
4,302,885  12/1981 Levine et al. .......................... 33/228
4,355,902  10/1982 Feist ................................... 356/147

*Primary Examiner*—William H. Punter
*Attorney, Agent, or Firm*—Jordan and Hamburg

[57] ABSTRACT

A method and an arrangement for automatic alignment of a geodetic angle measuring device, especially an electronic tachymeter for topographical survey, in the marking and measuring of points. The object of the invention consists in a rapid and precise, yet constructively and technologically simple solution. The novel feature is the utilization of a reference parameter, which at the device position and the target point is the same. Such reference parameters are the north direction and vertical direction, which are fixed at the target point and the device position by a circular or magnetic compass and pendulum or plumb line. In reference to such north direction and/or vertical direction, there is measured the target direction of a reflector at the target point and are formed the complementary angles by which the tachymeter has to be adjusted so that it can aim at the reflector.

2 Claims, 3 Drawing Figures

METHOD AND APPARATUS FOR AUTOMATIC ALIGNMENT OF AN ANGLE-MEASURING INSTRUMENT

FIELD OF APPLICATION OF THE INVENTION

This invention relates to a method for the automatic alignment of a geodetic angle-measuring instrument and an apparatus for carrying out the method. It is especially intended for the readjustment of electronic tachymeters in the measuring and marking of terrain points, in which several terrain points are measured from one tachymeter position.

CHARACTERISTICS OF KNOWN TECHNICAL SOLUTIONS

In a known tachymetric measuring process, there is provided at the instrument position an optical, electro-optical or automatic tachymeter, which is manned by at least one measuring attendant, and on a target point distanced therefrom a measuring rod or a reflector manned by an assistant, which are aimed at by the tachymeter. Herein the revolutions of the tachymetric telescope can be measured with respect to the vertical axis (azimuth measurement) and the horizontal axis (vertical angle measurement) as well as the distance between the instrument standpoint and the target point. At least two persons are needed for such measuring as well as a long time of exposure for the instruments, while only short measuring time is necessary. Efforts have, therefore, been made to automate the process of target finding and aiming at the target point (reflector) also in this case.

It has already been known to synchronously guide theodolites sent up separately from each other to move after a self-illuminated or solid target that travels at a constant speed. The target steering is done visually by hand, the post-guidance, however, is motor controlled. It has also been known to automatically guide astronomic telescopes, guns or satellite cameras on targets moving at high or low speeds through motor-wise revolution around corresponding axes. This, however, in each case requires a previous adjustment of the telescope, gun or satellite camera to the intended target point. In addition, this involves stationary measuring systems which are heavy, difficult to transport, and have a high energy consumption. There have further been known processes for radio-determination or radio-direction finding. For this purpose, depending on range of transmission (radius of action) and locating (navigation) accuracy, there are required different types of antennae which may be more or less expensive and heavy; in addition considerable expenses have to be incurred with electronic parts. Locating accuracies of $\geq 1°$, however, are not sufficient for the present purposes. Furthermore, the procedure of radio-determination or radio-direction finding is too time-consuming.

Finally, it has been known to guide building machines by optical rays or missiles by radio-guiding rays. Herein, however, previous active adjustment of the measuring instrument to the moving target is as important as the prevention of obstacles for the guiding rays. Moreover, also this type of measuring device involves high expenditures with additional equipment and energy consumption.

OBJECT OF THE INVENTION

It is the object of the present invention to overcome the mentioned deficiencies by providing an alignment possibility for the angle measuring device, especially an electronic tachymeter, without the need for an attendant at the tachymeter. Herein previous approximate alignment of the angle measuring device with the target is not necessary. On the other hand, precision in alignment is to correspond to precision in angle measuring of the device.

DESCRIPTION OF THE SUBSTANCE OF THE INVENTION

It is, therefore, the task of the present invention to provide a method and an arrangement for automatic alignment of an angle measuring device with a target, which is fast and sufficiently precise, yet simple and inexpensive as far as material and construction are concerned. Herein the invention takes on a new path since it uses a measuring or reference parameter as a basis which is practically the same both at the device position as also the target point.

According to this invention, the task is solved in that the target direction towards the angle measuring device is determined at the target point in relation to a preferential direction, especially a northern direction for the azimuth (the horizontal angle) and the plumb line for the vertical angle respectively; in that, therefrom, the targeting direction from the angle measuring device towards the target point in relation to a north direction and plumb line respectively is ascertained and that the angle measuring device, as concerns the azimuth and the vertical angle, is adjusted for so long until it indicates the target direction that has been ascertained. There is thus determined a complementary angle at the target point for alignment of the target means aligned to the angle measuring device, the angle measuring device being adjusted to such complementary angle. The target direction determined at the target point is, preferably, transferred to the device position wherein an already existing computer calculation of the complementary angle(s) and automatic alignment of the angle measuring device are processed.

An arrangement for carrying out the process of this invention will comprise, at the target point, an aiming means movable around two axes that is connected to a guiding means, for instance, a telescope, and a transmitter for transmission of the target direction values, and, at the device location, an angle measuring device with a receiver for the target direction values of the aiming means and a computer which, among other things, serves to determine the complementary angles as well as a device that indicates the north direction, for instance a circular compass or a gyroscope. The arrangement is characterized by the fact that the aiming means has attributed to it a direction indicator, similarly to the angle measuring device, and an angle measuring system with horizontal and vertical circles which correspond to those of the angle measuring instrument. The direction indicators fix the same reference direction for the azimuth, the north direction, at the target point and the device standpoint. Similarly, with the aid of a level quadrant, the plumb line is fixed at the target point, in which level quadrant, there may, for instance, be installed a reflective carrier. Thereby the two reference directions for the horizontal and vertical angles have been fixed. The transmitting-receiving arrangement merely serves to process data transmissions does not determine such data.

EXAMPLE OF EMBODIMENT

The invention will next be described in more detail with reference to the schematic drawing. The figures show:

FIG. 1, a representation to explain the principle of azimuth transmission

Figure 2:
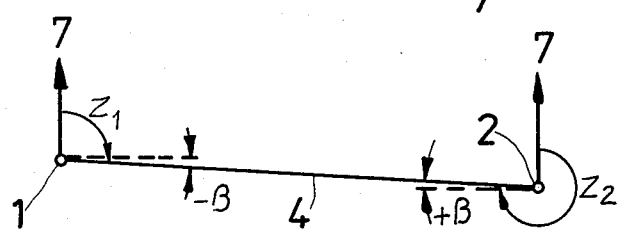
Figure 3:
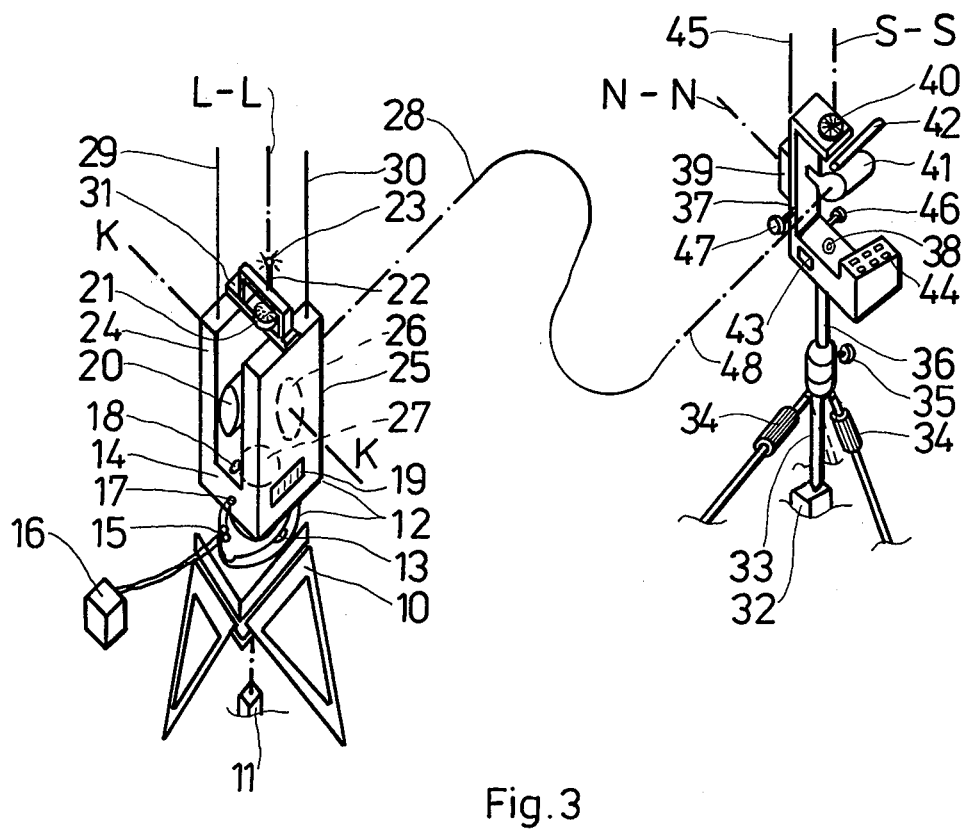

FIG. 2, a representation to explain the principle of vertical angle transmission and FIG. 3, a perspective view of an arrangement according to the present invention.

In FIGS. 1 and 2, 1 is the position of an angle measuring device, 2 a target point and 3 the north direction which is the same at the device position as at the target point. The connecting line 4 of device position 1 with the target point 2 in combination with the north direction 3 produces an angle $r_2$ at the target point 2 and an angle $r_1$ at device position 1. With respect to the north direction 3, the angle measuring device (FIG. 3) may initially have an orientation 5 with an angle an indication of direction $r_{10}$ and the aiming means (FIG. 3) an orientation 6 with an angle or indication of direction $r_{20}$. Initially, the origin of the horizontal circle of the aiming means is oriented to magnetic or to gyroscopic north, whereafter orientation $r_2$ is determined. In like manner, the origin of the horizontal circle of the angle measuring device is aligned to the north direction 3. Thereafter, $r_1 = r_2 - 180°$ is determined, thereby the angle measuring device being directed to the target point 2.

In like manner as for the north direction 3, the angle measuring device and the aiming means (the reflector) are oriented to the plumb line 7, deviation $\beta$ from the horizontal plane being then measured at the respective site. Here $-\beta = 90° - z_1 = 270° - z_2$, wherein $z_1$ and $z_2$ represent the zenith distances. The complementary angle for azimuth targeting is $r_1$, for zenith targeting $-\beta$.

In FIG. 3 an electronic tachymeter 12 has been arranged on a tripod 10 over a terrain point position 11, which on a levelling arrangement 13 has a measuring head 14 with steering elements for target setting for azimuth and zenith targeting. The coupling 15 for a separately arranged battery 16 are provided on the levelling arrangement 13. On measuring head 14 there are provided a centering device 17 for setting up tachymeter 12 over the terrain point 11, a box level 18 for vertical positioning, a registration and indication arrangement 19 for tacymetrically ascertained data, a measuring telescope 20 for emitting and receiving optical rays, a direction indicator 21 for the north direction and a sighting rod 22 with a signal lamp which is fed by a battery 16. A bridge 31 mounted on supports 24, 25 carries the direction indicator 21, the sighting rod 22 and the signal lamp 23. The measuring telescope 20 is mounted on the supports 24, 25 of the measuring head 14 in a revolvable position around a substantially horizontal axis K—K and at the same time, jointly with the measuring head, revolvably around a vertical axis L—L that traverses terrain point 11. A vertical circle 26, arranged on support 25 concentrically to axis K—K serves to measure the revolutions, to which has been attributed an inclinometer that has not been illustrated in order not to complicate viewing of the drawing, and may have a form as described in DD 20703. A horizontal circle 27 arranged in measuring head 14 concentrically to axis L—L serves to measure the revolutions around axis L—L. In measuring head 14 there are further provided transmitter, receiver and evaluation electronics (computer) for the electrooptical straightway measurement, such as they are described, for instance, in DE-OS No. 2750933 (based on U.S. patent application Ser. No. 742,938 filed Nov. 18, 1976), which are energized by battery 16. The sighting axis of measuring telescope 20 is designated by 28. In support 24 there is provided a receiving antenna 29 followed by evaluating and correcting means.

Support 25 carries a transmitting antenna 30 for the measured data.

Over a target point 32 in the terrain spaced from the terrain point position, there is equally assembled a tripod 33 with the levelling elements 34, which tripod carries a rod 36 which can be adjusted (displaced) in height and locked by a screw 35, which rod is provided with a substantially U-shaped carrier 37. The carrier is revolvable around a vertical axis S—S containing the target point 32 and comprises a box level 38 for vertical setting of rod 36 with the carrier 37, a vertical directional indicator (vertical circle) 39 and a horizontal directional indicator (circular compass) 40, a reflector 41 with an aiming means (diopter) 42, wich can be inclined around axis N—N, a battery 43 as a voltage source, a input unit 44 for data and functions and a transmission unit comprised by a transmission antenna 45. Carrier 37 contains, in addition, the operating buttons 46, 47 for precise horizontal and vertical aiming respectively. The reflector 41 and aiming means 42 are arranged optically parallel to each other securing a targeting axis 48 tightly between themselves.

Tripod 33, and thereby carrier 37, are set-up in a perpendicular position over target point 32 with the aid of the box level 38 and the levelling elements 34. The desired height of carrier 37 is obtained through adjustment of the rod in tripod 33. Next the aiming means 42 is aligned to target rod 22 and/or signal lamp 23 by means of a revolution of carrier 37 around axis S—S and of reflector 41 around axis N—N. The approximate target setting is made by hand, precise aiming is adjusted by means of the two operating buttons 46, 47. After exact alignment of reflector 41 to the electronic tachymeter 12, the adjusted directions are read on the horizontal and vertical direction indicator 39 resp. 40 and fed through input unit 44 into a transmission unit provided on carrier 37 which with the aid of transmitting antenna 44 transmits it to the electronic tachymeter 12. Through antenna 29 electronic tachymeter 12 receives the directions set, calculating the complementary angles in a computer that has not been represented in the drawing but is provided in measuring head 14, and aligns the measuring telescope 20 with the aid of the steering elements (motors and driving elements) provided in the measuring head 14 to reflector 41. Herein the complementary angles $r_1$ and $-\beta$ in the horizontal circle 27 and vertical circle 26 respectively are set automatically so that the aiming axes 28 and 48 essentially fall together. From electronic tachymeter 12, there may also be transmitted measuring data to the target point 32 through a transmission unit with transmission antenna 30, for the receipt of which an attendant located at the target point should have a receiving instrument at disposal. The directions set at a precise alignment of reflector 41 may also be detected automatically by input unit 44 without the need for manual maneuvering and transmitted to electronic tachymeter 12.

After preceise alignment of the electronic tachymeter 12 to target point 32 embodied by reflector 41, the electronic tachymeter 12 automatically measures the angles and distance from position 11 to target point 32 in a manner already known from DE-OS No. 2750933.

If reflector 41 is set up over another target point, or if there are other target points over which such reflectors have been placed, and which are to be measured by the electronic tachymeter 12, then the aforedescribed procedure of alignment and measurement is to be repeated.

I claim:

1. A method for automatically aligning a geodetic angle-measuring device to a target point, comprising determining the target direction to the angle measuring device at the target point with respect to the north direction and the vertical direction, respectively, then determining the target direction from the angle measuring device to the target point from the results of the first mentioned determining step and then adjusting the angle measuring device, with respect to the horizontal angle and vertical angle, until it points to the target direction that has been determined in the second mentioned determining step.

2. In an arrangement for automatically aligning a geodetic angle-measuring device to a target point, comprising a targeting means at the target point and connected to a directing means oscillatable around two axes, a transmitter at the target point and an angle measuring device with a transmitter, a computer and a direction indicator at the device position, the improvement wherein a direction indicator and an angle measuring system are affixed to the target means, the direction indicator and angle measuring system corresponding to those of the angle measuring device.

* * * * *